(12) United States Patent
Sartor et al.

(10) Patent No.: US 9,453,770 B2
(45) Date of Patent: Sep. 27, 2016

(54) STRAIN MEASUREMENT DEVICE AND INSTALLATION OF SUCH A DEVICE IN AN ELEMENT

(71) Applicant: Airbus Operations S.A.S., Toulouse (FR)

(72) Inventors: Marc Sartor, Toulouse (FR); Patricia Morgue, Colomiers (FR); Manuel Paredes, Balma (FR)

(73) Assignee: AIRBUS OPERATIONS S.A.S., Toulouse (FR)

( * ) Notice: Subject to any disclaimer, the term of this patent is extended or adjusted under 35 U.S.C. 154(b) by 0 days.

(21) Appl. No.: 14/080,858

(22) Filed: Nov. 15, 2013

(65) Prior Publication Data

US 2014/0153863 A1    Jun. 5, 2014

(30) Foreign Application Priority Data

Nov. 23, 2012   (FR) ..................... 12 61173

(51) Int. Cl.
| | |
|---|---|
| *G01L 1/24* | (2006.01) |
| *G01M 11/08* | (2006.01) |
| *G01D 5/353* | (2006.01) |
| *G01B 11/16* | (2006.01) |
| *G01M 5/00* | (2006.01) |

(52) U.S. Cl.
CPC ............... *G01L 1/246* (2013.01); *G01B 11/18* (2013.01); *G01D 5/35316* (2013.01); *G01M 5/0025* (2013.01); *G01M 5/0041* (2013.01); *G01M 5/0091* (2013.01); *G01M 11/086* (2013.01)

(58) Field of Classification Search
CPC .... G02B 11/18; G01L 1/246; G01M 11/086; G01M 5/0025; G01M 5/0041; G01M 5/0091; G01B 11/18; G01D 5/35316

USPC .......................................... 385/12
See application file for complete search history.

(56) References Cited

U.S. PATENT DOCUMENTS

| | | | | |
|---|---|---|---|---|
| 4,729,630 | A * | 3/1988 | Martinez ......................... 385/13 |
| 4,800,267 | A * | 1/1989 | Freal et al. .............. 250/227.16 |
| 4,890,896 | A * | 1/1990 | Meis ............................... 385/55 |
| 5,818,982 | A * | 10/1998 | Voss et al. ..................... 385/13 |
| 5,945,665 | A * | 8/1999 | Hay ........................ 250/227.14 |
| 6,105,620 | A * | 8/2000 | Haberl ......................... 138/118 |
| 6,127,672 | A * | 10/2000 | Danisch ................. G06F 3/011 250/227.14 |
| 6,218,941 | B1 * | 4/2001 | Cromer et al. ............ 340/572.1 |
| 6,384,404 | B1 * | 5/2002 | Berg ..................... G01B 11/18 250/227.16 |
| 6,563,107 | B2 * | 5/2003 | Danisch ................. G01B 11/18 250/227.14 |

(Continued)

FOREIGN PATENT DOCUMENTS

| | | |
|---|---|---|
| DE | 10031412 A1 | 10/2001 |
| JP | 2005010064 A | 1/2005 |
| KR | 20060119623 A * | 11/2006 |

OTHER PUBLICATIONS

French Searching Authority, French Search Report for French Application No. 1261173 Dated Jul. 26, 2013.

(Continued)

*Primary Examiner* — Peter Radowski
(74) *Attorney, Agent, or Firm* — Lorenz & Kopf, LLLP

(57) ABSTRACT

A strain measurement device is provided. The strain measurement device includes at least one filiform strain sensor and a support of longilinear shape on which the filiform strain sensor is positioned. The strain measurement device also includes a stiffener.

16 Claims, 1 Drawing Sheet

(56) References Cited

U.S. PATENT DOCUMENTS

| | | | |
|---|---|---|---|
| 6,937,151 B1* | 8/2005 | Tapanes | 340/550 |
| 7,069,958 B2* | 7/2006 | Filho | F16L 35/00 138/106 |
| 7,486,852 B2* | 2/2009 | Rothenberg | G02B 6/022 385/27 |
| 8,733,162 B2* | 5/2014 | Wood | G01H 13/00 73/147 |
| 2002/0088931 A1* | 7/2002 | Danisch | G01B 11/18 250/227.14 |
| 2005/0147340 A1* | 7/2005 | Tapanes | 385/12 |
| 2005/0166988 A1* | 8/2005 | Filho | F16L 35/00 138/153 |
| 2007/0019918 A1* | 1/2007 | Rothenberg | G02B 6/022 385/123 |
| 2007/0144267 A1* | 6/2007 | Sato | G01L 5/24 73/761 |
| 2008/0174428 A1* | 7/2008 | Piper et al. | 340/555 |
| 2009/0040046 A1* | 2/2009 | Browning et al. | 340/552 |
| 2009/0217769 A1* | 9/2009 | Roberts | G01B 11/18 73/800 |
| 2010/0232963 A1* | 9/2010 | Volanthen | F03D 1/065 416/146 R |
| 2011/0007996 A1* | 1/2011 | Huffman | 385/13 |
| 2011/0107829 A1* | 5/2011 | Wood | G01H 13/00 73/147 |
| 2011/0199608 A1* | 8/2011 | Nicolas | E21B 17/017 356/243.1 |

OTHER PUBLICATIONS

European Patent Office, European Search Report for European Patent Application No. 13192742 mailed Dec. 6, 2013.

* cited by examiner

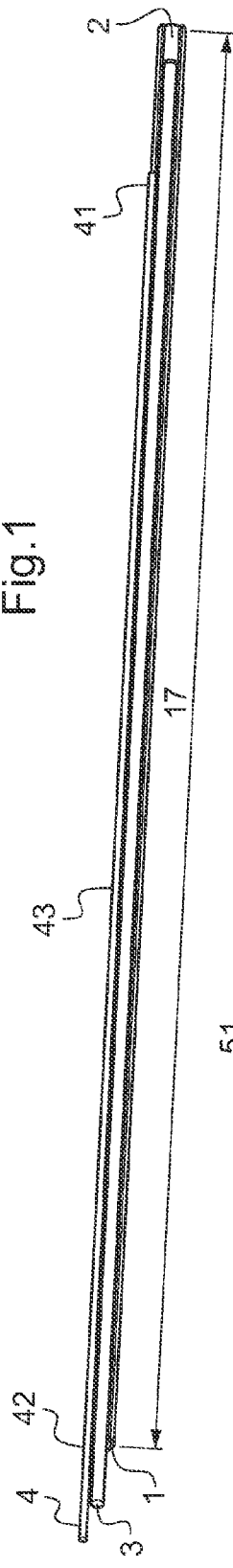
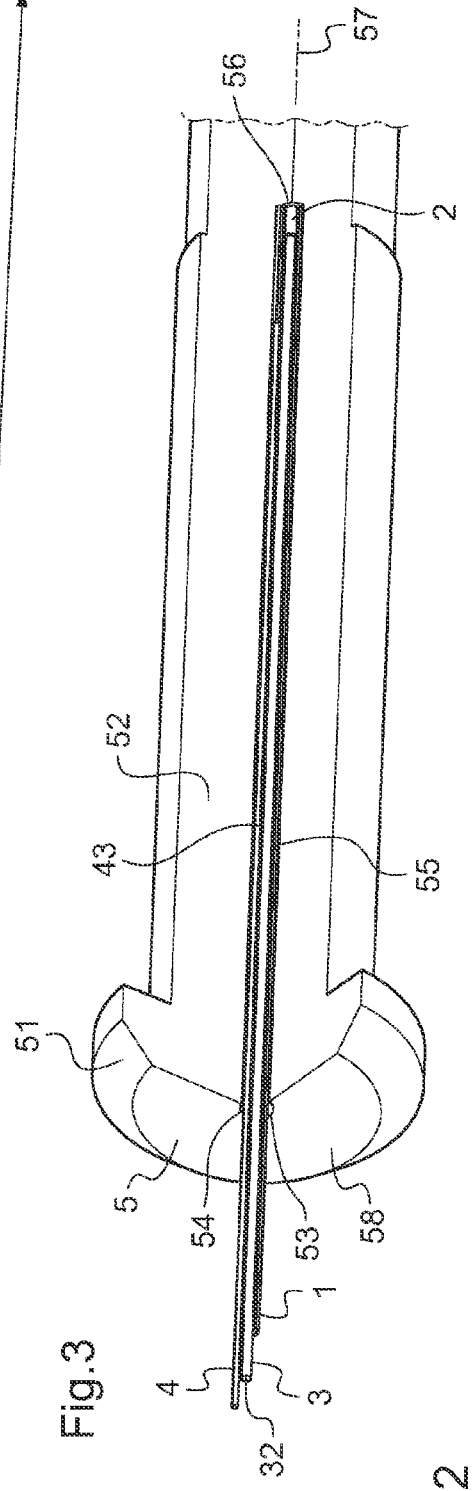
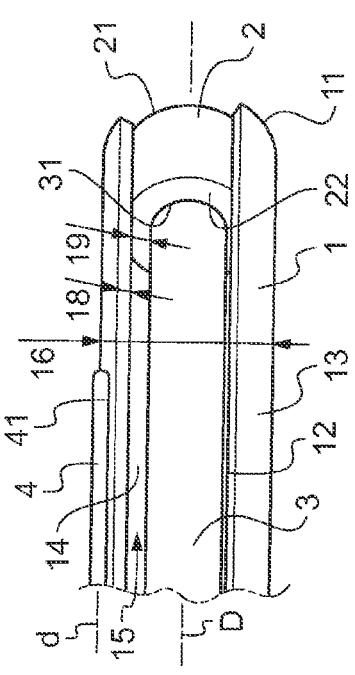
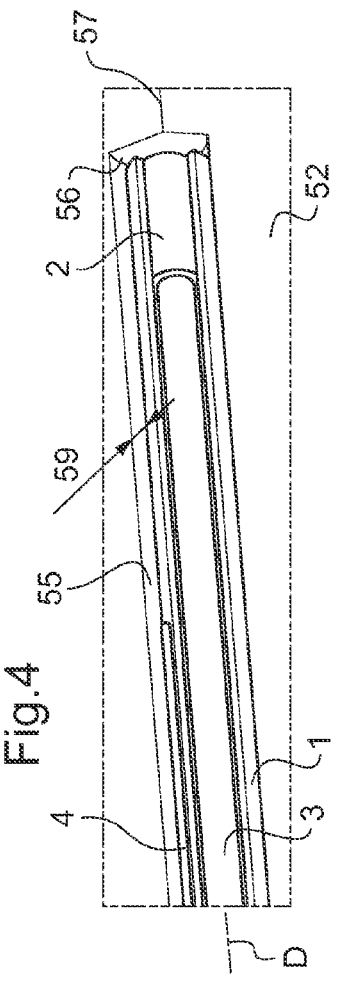

STRAIN MEASUREMENT DEVICE AND INSTALLATION OF SUCH A DEVICE IN AN ELEMENT

CROSS-REFERENCE TO RELATED APPLICATION

This application claims priority to French Application No. 1261173, filed Nov. 23, 2012, which is incorporated herein by reference in its entirety.

TECHNICAL FIELD

This application pertains to a deformation measurement device, for example using an optical fibre Bragg grating, for improving the measurement of strains at the core of a structural element, and thus obtain, in particular, better control of the quality of an assembly, produced using such an element.

BACKGROUND

One of the main objectives in civil aviation is increasing the lifespan of aircraft.

During the production phase, the assembly of two elements comprising a composite material is always a long and complicated phase, and generally requires the use of a fastener as it is not possible to weld them together, contrary to what was habitually done with metallic elements.

Numerous studies have then aimed at optimising the steps of assembly and process, while maintaining a high level of quality.

The reduction in fuel consumption is also a key factor that has to be taken into account during the design of new aircraft; weight saving can also be achieved, even for a metal structure, by taking into account the assembly stresses in a preliminary design phase, provided that it is possible to subsequently test the assembly.

In order to do this, non-destructive test methods are increasingly preferred, even for more specific purposes such as the assembly phase.

The quality of an assembly is often associated with a stress level reached inside a fastener.

This stress (commonly called prestress or pre-load for the subsequent lifespan when it results from an assembly step) in an assembly comprising elements (in particular metal) has a direct effect on the lifespan of the assembly as regards fatigue. The dimensioning of the elements therefore has an impact on the lifespan of the structure.

It is also possible to achieve weight savings in the design of these items by taking into account these stresses during their dimensioning.

The prestress can be achieved at a final step of the assembly phase when definitive fasteners are used, but also at a step further upstream dedicated to the preparation of the assembly when temporary fasteners are used.

The stress test can be carried out quite easily in a laboratory using a torque-tension test bench, or a piezoelectric wafer incorporated into the assembly, but also by strain measurement of the fasteners, which can be linked to the stress level in the element by a stress-strain behaviour law. Measurement of the strain, and more particularly of the elongation in a chosen direction, can be carried out directly when the structure allows it (for example using a strain gauge or an extensometer), or by using, for example, an ultrasound method.

The determination of stress by a torque-tension test or piezoelectric wafers requires however the use of other elements inside the assembly itself. It is then necessary to use joint components of larger dimension for the test, which then impacts and modifies the rigidity of the assembly, even influencing the performance of the structure, which, as a result, is no longer representative of reality. The interposition of such sensors requires moreover assembly then disassembly of the structure once the measurement has been taken, with use restricted to the laboratory, i.e. it is not possible to incorporate into a definitive structure intended to be used in the finished product.

Furthermore, the methods of measurement by ultrasound are only applicable to certain configurations. These methods are, for example, ineffective when the fasteners are installed with an interference fit which induces inhomogeneous stresses in the element causing disruptions in the measurement of the propagation time of the ultrasonic wave, commonly called "ultrasonic wave time of flight" or when the joining component is crimped, or if a structural element is broken during installation, no longer permitting reference to an initial time of flight of the element before use.

Thus, these techniques are not suitable for the situation in view of the required level of accuracy.

A method involving the use of an optical fibre Bragg grating (FBG) sensor is then advantageously used to evaluate the strains inside an element whatever it is.

The use of a fibre Bragg grating (FBG) positioned in the centre of a fastener is a useful method in that it does not induce disturbance at the level of the functional surfaces of the assembly. Such a measurement is local, and can thus be carried out in a zone with a shallow strain gradient and as a result is indirectly linked to the prestress.

The use of an FBG is for example disclosed in the document U.S. Pat. No. 5,945,665. This document describes a method consisting of drilling a hole at the level of the central core of a fastener, filling the hole with glue (or any other similar material such as for example resin), and installing an optical fibre in it, before polymerization of the glue.

From the point of view of production, installation of the optical fibre is a complicated operation. The glue must be chosen with respect to the material constituting the element, the fibre may be damaged during its installation (in particular with respect to its dimensions, a fibre having a diameter of the order of a few tens of micrometers on average), and it is difficult to obtain accurate positioning of the Bragg grating with respect to the element.

Moreover, when the fastener is then used with an interference fit, this technique can no longer be considered, as the clamping generates compression around the fibre having an effect on the optical response, and no longer allows a reliable analysis of the measurement for determining the strain and then estimating the stress in the fastener.

Other objects, desirable features and characteristics will become apparent from the subsequent summary and detailed description, and the appended claims, taken in conjunction with the accompanying drawings and this background.

SUMMARY

According to the various teachings of the present disclosure, provided is a device and a method for strain measurement that is non destructive and not very intrusive due to its low impact on the structure in any element whatever, and which can be used for a fastener, without impacting on the rigidity of the assembly and in particular which is compatible with the majority of the applications in common use in aeronautics, such as interference fit assemblies, swaged or locking fasteners (for example a lock bolt), or also a temporary fastener or for pinning. The various teachings of the present disclosure also provide a device which makes it possible not only to assist the introduction of a fibre, but which can also be used for introducing other types of sensor.

Thus, according to various embodiments, the present disclosure provides a non-destructive test method of the quality of an assembly via the evaluation of a stress inside a structural element, and in particular a fastener, whatever it may be.

To that end, according to one of various aspects of the present disclosure, a strain measurement device is proposed comprising at least one filiform strain sensor as well as a support having a longilinear shape on which the filiform strain sensor is positioned.

It is understood here by the fact that the measurement device comprises at least one filiform strain sensor, that it may comprise only one, or several. The device, generally, has a thin elongated shape so that it can be introduced into a hole that is as narrow as possible. In order to do this, it is advantageous that the support has a longilinear shape.

According to the application chosen, the filiform strain sensor is twisted.

In a general case, the support can have a truncated or tiered shape. Its shape is then adapted to the application for which it is intended.

It is for example useful that the support has an axis of symmetry, for example in a longitudinal direction (D). The support has for example a hexagonal or circular cross section.

It is also useful that the support has a cylindrical shape depending on the requirements of the application.

By "cylindrical" it is meant that the support has a substantially constant cross section along an axis, such as rectilinear, for example in a longitudinal direction (D). The cross section can be of any shape provided that the support allows the fibre to be held in position. The cross section of the support is for example circular, so that the support has a tubular shape which facilitates its production.

In order to facilitate the handling and installation of the support, the device comprises for example a stiffener, in order to give it greater rigidity.

The stiffener is generally free with respect to the support, or fixed at one point at most, in order not to affect the measurement; in other words, the stiffener is, at most, fixed at one point to the support.

The stiffener is, for example, introduced into an internal volume defined by a wall of the support in the case of a hollow support. For example with a cap which closes one end of a hollow support, the stiffener is supported on the cap, or connected to or set into the cap.

The stiffener is for example a rod with a length at least equal to that of the support, this allows the stiffener to extend beyond the support. It is then possible to choose to withdraw the stiffener after the insertion of the support into a hole for carrying out a measurement or to leave it in the device.

According to one exemplary embodiment, the stiffener and a wall of the support leave a space between them, as clearance, so that the support retains a freedom of movement with respect to bending. In the case of a hollow support, the space is for example arranged all around the stiffener, then introduced into the internal volume of the support.

According to one embodiment, the filiform strain sensor is an optical fibre Bragg grating, with one or more gratings.

The fibre Bragg gratings are particularly well suited due to their geometry which allows easy introduction into a hole of a structural element, while best minimizing the dimensions of the hole.

Furthermore, using the measurement device, it is then much easier to insert a fibre into a hole while retaining its integrity.

According to one exemplary embodiment, the support has a longitudinal direction (D) and a width, a main strain direction (d) of the filiform strain sensor being arranged parallel to the longitudinal direction (D) of the support, on an external surface of the support, by one or more connecting points.

According to one of various embodiments, the support is hollow, has a longitudinal direction (D) and a width, and comprises moreover a wall having a thickness and having an external surface on which the filiform strain sensor is positioned by one or more connecting points, and a main strain direction (d) of the filiform strain sensor is arranged parallel to the longitudinal direction (D) of the support.

According to one exemplary embodiment, a measurement zone of the filiform strain sensor is free with respect to the external surface of the support, the fastening points (also designated connecting points) being generally situated at a distance from the measurement zone of the filiform strain sensor in order not to influence the measurements.

Within this application, the phrase "measurement zone" is a sensitive portion, within the filiform strain sensor, for carrying out the measurement. In the case, for example, of a fibre Bragg grating, the measurement zone is then the zone of the Bragg grating.

The support is generally suitable for the use envisaged, for example when the element of which it is sought to determine the state of stress is subjected to a significant radial pressure (such as for example an interference fit). A support of cylindrical shape is advantageous. Moreover, if a support of cylindrical, hollow form is chosen, it defines a thin and relatively flexible, supple envelope, in order to be capable of a certain radial deformation, so as not to disturb the measurements of the filiform strain sensor.

In this way, the strains of the filiform strain sensor remain reliable as the filiform strain sensor is then significantly less compressed.

Such a device therefore not only allows the filiform strain sensor to be accurately positioned on the support, but also to be held there, and the measurement method defined subsequently to be implemented.

Furthermore, the principle of pre-positioning a filiform strain sensor on a support intended to be inserted subsequently into an element of which it is sought to determine the prestress state, is compatible with any type of filiform strain sensor, and in particular an FBG.

Such a device also allows control of the positioning of the filiform strain sensor, and in particular of its measurement zone, on the support, for example thanks to one or more markers.

The filiform strain sensor is generally placed on the support paying attention to accurate marking of the position of the measurement zone with respect to a reference point on the support. A method for maintaining the filiform strain sensor in position on the support comprises for example using a binder at several points, generally outside the measurement zone.

This method allows an effective control of the orientation of the filiform strain sensor on the support and this orientation will be retained during the insertion into a receiving piece and during an operating phase.

In fact, in order to carry out a measurement, the device is generally inserted into a hole previously formed in a structural element pre-filled with binder, in liquid or paste form.

Once introduced, the device is positioned axially in the hole, in one example, using a marking system, such as for example a mechanical stop or a contact in the bottom of the hole. A double marking, both of the filiform strain sensor with respect to the support, and of the support with respect to the receiving piece allows accurate control of the position of the measurement zone with respect to the receiving piece the strains of which are to be measured.

In order to avoid a hollow-type support being filled with binder during its introduction into a receiving piece the strains of which it is sought to measure, one end of the support is generally blocked. In one example, the wall of the support is closed, i.e., for example in the case of a circular cross section that has an "O" shape rather than a "C" shape which would then be open.

For example, the support is blocked by a cap, one end of which extends beyond the end of the support, which allows, for example, a protective stop for the end of the support to be formed, or damping of contact between the device and for example the bottom of a hole during the introduction of the device at the bottom of a closed hole, or also to assist and facilitate its insertion.

Advantageously, the device comprises a thin tube encapsulating at least the filiform strain sensor by use of the binder. That is to say that the thin tube, according to the requirements of the application, encapsulates the filiform strain sensor individually so as to protect it, in particular during the insertion of the device into the hole, or the device in its entirety, which then makes it possible to ensure that the filiform strain sensor is positioned and held on the support.

Within this application, the term "thin" is meant that the tube generally has a wall thickness that does not disturb the measurements.

The binder is for example a resin. It may be desirable to use the same binder as that with which the hole is filled in order to minimize any influence of the binder on the measurements. It is possible to use any sort of binder provided that it performs its main role of adhesion between the bonded parts and that it does not creep during the deformation measurement.

Moreover, a filiform strain sensor is generally sensitive to temperature. In order to take into account variations in temperature during the measurements, it is useful for the device to comprise an additional deformation sensor, free of deformation with respect to the support.

The additional deformation sensor is for example situated in an internal volume defined by the wall of the support when this is hollow, so that its measurement zone is free from deformation (i.e. zero stress) with respect to the structural element in which the device will be inserted.

The additional deformation sensor is also optionally filiform, even twisted if necessary.

It can also be encapsulated, as described previously, if necessary.

The additional deformation sensor is, in one example, a fibre Bragg grating. In general terms, it is advantageous for all the deformation sensors, if the device comprises several of them, to be identical, in order to better guarantee the quality of the measurements, and to be for example optical fibre Bragg gratings.

The present disclosure also relates to a structural element, the residual stresses of which it is sought to determine, comprising a hole, a first end of which opens onto a first surface of the element, the hole containing at least one measurement zone of a filiform strain sensor of a deformation measurement device as defined previously, as well as a binder forming a film surrounding the deformation measurement device.

Advantageously, the support of the device also serves as support for making the connection outside the hole of the structural element, i.e. connecting at least the filiform strain sensor to a measurement device. It is then convenient for the support to have a length greater than the depth of the hole.

For measurements with an optical fibre, the optical connection of the fibre is then for example made by a connector fixed onto the element or by a link at the end of the fibre for remote connection.

The presence of other markers, for example both on the device (and in particular on the support) and on the first surface of the element allows moreover precise control of the orientation and positioning of the device in the element, and as a result of the measurement zone of the filiform strain sensor with respect to the receiver element.

The hole is advantageously dimensioned so that its width is slightly greater than that of the support. That is to say that the hole is dimensioned so as to only produce an optimum clearance between it and the device. If the clearance is too small, insertion of the device would become difficult due to the viscosity of the binder which could no longer flow easily between the device and the wall of the hole. Conversely, a clearance which is too large would produce false measurements as the filiform strain sensor positioned on the support of the device would no longer be close enough to the wall of the hole to produce a representative measurement.

Furthermore, the smaller the dimensions of the hole, the lesser the effect of the presence of the device on the behaviour of the element and the rigidity of the affected structure.

The hole generally has a circular cross section, its width then corresponding to the diameter of the hole. In this case, it is for example bored. It can however have any type of shape, for example octagonal, or a shape complementary to that of the device, which moreover would allow it to act as a locator, thus guaranteeing the correct orientation of the device in the receiver element. Such holes can then be made, for example, by spark erosion or directly during the production of the element.

The relative dimensions of the hole and of the device moreover allow the thickness of a film of binder interposed between the support and a lateral wall of the hole to remain relatively small. Thus, the filiform strain sensor is as close as possible to the surface of the hole where the measurement is intended to be taken. Furthermore, the measurement is then little disturbed by the mechanical behaviour of the film of binder.

Advantageously, the hole has a second end which is closed, i.e. blind, not a through-hole, either because it has been blocked, obstructed, or because the second end of the hole is not open, does not pass through.

A closed hole facilitates the insertion of the device by allowing control of its axial positioning, by bringing the support into abutment against the bottom of the hole.

In one example, the hole is made in the core of the element, i.e. generally at the centre, or close to a neutral fibre, for measuring the stress linked to tension or compression of the element without interference from flexural instability for example. Advantageously, the hole is least approximately coaxial with an axis of symmetry of the element.

The hole can also be formed in the periphery of a fastener, and it is then possible to make several holes each comprising a device for taking account of an instability, a buckling, a bending of the element.

Finally, the present disclosure also relates to a method for measuring a strain in a given direction within a structural element, comprising at least the following: Introducing binder into a hole formed in the element; inserting a device as defined previously into the hole filled with binder; and connecting a filiform strain sensor of the device to a measurement device.

Therefore, such method is compatible with a large range of elements, and in particular fasteners, commonly used in aeronautics (including swage fasteners, for example for crimping).

Advantageously, the device is introduced at the same time as a stiffener, and the stiffener is withdrawn once the device is inserted into the hole, which makes it possible, for example, to minimize any risk of buckling the support during the introduction of the device. For example, if the device comprises a hollow support, the device is introduced at the same time as a stiffener arranged inside a hollow support of the device and the stiffener is withdrawn once the device is inserted into the hole.

Withdrawing the stiffener allows, in this case, to leave more scope for the support to deform radially, which is particularly useful in an interference fit.

And in one example, the device is introduced into the element using the stiffener, which guarantees a gripping area without the risk of damaging the support or the filiform strain sensor.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 1 represents a device according to various embodiments of the present disclosure;

FIG. 2 shows in detail one end of the device intended to be inserted to the bottom of a hole;

FIG. 3 represents the device in a fastener; and

FIG. 4 shows in detail the device in the bottom of the hole.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

A device according to the various teachings of the present disclosure comprises a support 1 one end 11 of which is closed by a cap 2, a stiffener 3, and an optical fibre Bragg grating as filiform strain sensor 4. The description which follows would however be valid with any type of filiform strain sensor, twisted or not twisted, as mentioned previously, in place of a fibre Bragg grating.

In the exemplary embodiment represented in FIGS. 1 to 4, the support 1 has a hollow cylindrical shape with a circular cross section, i.e. a tubular shape. It comprises a wall 12 having an external surface 13 and an internal surface 14 delimiting an internal volume 15. It also comprises two ends, one end 11 of which is blocked by a cap 2, inserted at least partially into the internal volume 15. The cap 2 serves on the one hand to stop some binder being introduced into the support when the device is inserted into a hole 53, and on the other hand part to hold a stiffener 3.

The support 1 has a width 16 and a length 17. The width 16 corresponds to an external diameter of the support 1 (measured orthogonally to a longitudinal axis D).

The external surface 13 and the internal surface 14 define between them a thickness 18 of the wall 12, which is at least ten times smaller than the width 16.

The cap 2 has a first end defined by an outer surface 21 and a second end defined by an inner surface 22 directed towards the internal volume 15 of the support 1. The cap 2 has a cylindrical shape complementary to the internal surface 14 of the support 1 in order to provide sealing at the end 11 of the support 1.

The outer surface 21 of the cap 2 and the end 11 of the support 1 are in this case coplanar. Furthermore, the end 11 of the support 1 as well as the surface 21 of the cap 2 shown here have a straight cross section, i.e. orthogonal to the longitudinal axis D of the support 1. According to another exemplary embodiment which is not shown, it could be chamfered so as to facilitate the insertion of the device into the hole, or the surface 21 of the cap 2 could extend beyond the end 11 so as to form a damper when the device abuts the bottom of a hole.

The second end of the cap defined by the surface 22 is parallel to the surface 21. It receives one end 31 of the stiffener 3, which is for example supported by but is generally bonded to a middle of the surface 22.

The stiffener 3 also has a cylindrical shape with a circular cross section, so as to form a rod.

Thus, the support 1, the cap 2 and the stiffener 3 are aligned with respect to the axis D which therefore forms an axis of symmetry of this assembly.

The stiffener 3 and the internal surface 14 define between them a space 19 in the internal volume 15 allowing the support 1 to retain a flexibility despite the presence of the stiffener 3. It is for example possible to position an additional deformation sensor (not shown) in this space in order to compensate for thermal variations for example, as mentioned previously.

Moreover, the stiffener 3 extends beyond the support 1 at its other end 32 which allows a gripping area to be constituted for handling the device.

The filiform strain sensor 4 is in this case a fibre Bragg grating positioned on the external surface 13 of the support 1.

The filiform strain sensor 4 has an axis d parallel to the axis D of the support 1 along which deformation can take place. The axis d therefore constitutes a main strain direction of a measurement zone 43 of the filiform strain sensor 4, in this case at least one fibre Bragg grating. The filiform strain sensor 4 is connected to the support 1 by two spots of binder situated at the ends of the filiform strain sensor 4. In the present exemplary embodiment, the filiform strain sensor 4 extends beyond the support 1 on the side of its end which the stiffener 3 extends beyond. The connecting points are then generally situated at an end 41 of the filiform strain sensor 4 and at a point 42 situated at a distance from the measurement zone 43. The measurement zone is for example situated in the middle of the two points 41, 42.

The device as described previously is intended to be inserted into a hole 53 of an element 5.

According to the present exemplary embodiment, the element 5 has a head 51 and a body 52 such that an axis 57 of the element 5 constitutes an axis of symmetry.

The hole 53 has a surface 55, a first end 54 opening onto a surface 58 of the head 51, and a second end 56 forming a bottom. The hole 53, produced for example in this case by boring, is closed and is not a through hole. When the device is inserted into the hole 53, the end 21 of the cap 2 then abuts the bottom 56 of the hole 53, which guarantees the positioning of the filiform strain sensor 4, and in particular of its measurement zone 43, along the axis 57. The surface 58 can moreover have at least one marker facilitating the orientation of the device in the hole (such a marker is not shown here).

The support 1 or the stiffener 3 can moreover have at least one marker located on the exterior of the element 5 facilitating control of the position of the device.

The hole 53 has moreover a depth along the axis 57 such that, when the device is inserted into the hole 53, the hole 53 comprises at least the measurement zone 43 of the filiform strain sensor 4, i.e., in this case, the fibre Bragg grating. Advantageously, the device extends beyond the end 54 of the hole 53 so as to facilitate its handling.

Before insertion of the device, the hole 53 is partially or completely filled with binder (not shown). The surface 55 of the hole and the device between them define a clearance 59, i.e. a small space, so that the binder then forms a film around the device inserted into the hole 53. Moreover the binder at least covers the measurement zone 43.

Furthermore, the hole 53 is positioned so that the axis 57 of the element 5 is at least approximately merged with the axis D of the support 1 of the device, i.e. the hole 53 is generally formed starting from the centre of the surface 58, so that the device measures the strains as close as possible to the core of the element 5.

In order to take the measurements, the filiform strain sensor 4 is then connected to a measurement device, which is not shown here.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A strain measurement device, comprising:
   at least one filiform strain sensor;
   a support of longilinear shape on which the filiform strain sensor is positioned; and
   a stiffener;
   wherein the stiffener and a wall of the support are coupled together so as to define a space between the stiffener and the wall of the support so that the support retains a freedom of movement with respect to bending.

2. The device according to claim 1, wherein the stiffener is at most fixed to the support at one point.

3. The device according to claim 1, wherein the filiform strain sensor is an optical fibre Bragg grating.

4. The device according to claim 1, wherein the support is hollow, and has a longitudinal direction and a width, with the support further comprising a wall having a thickness and having an external surface on which the filiform strain sensor is positioned by one or more connecting points, a main strain direction of the filiform strain sensor being arranged parallel to the longitudinal direction of the support.

5. The device according to claim 4, wherein one end of the support is blocked.

6. The device according to claim 5, wherein the support is blocked by a cap an end of which extends beyond the end of the support.

7. The device according to claim 1, wherein the device comprises a thin tube encapsulating at least the filiform strain sensor with a binder.

8. The device according to claim 4, further comprising an additional strain sensor, free of deformation with respect to the support, and situated in an internal volume defined by the wall of the hollow support.

9. A structural element, comprising:
   a first surface;
   a hole having a first end that opens onto a first surface;
   a strain measurement device received in at least one measurement zone associated with the hole, the strain measurement device including at least one filiform strain sensor, a support of longilinear shape on which the filiform strain sensor is positioned and a stiffener; and
   a binder forming a film surrounding the strain measurement device;
   wherein the stiffener and a wall of the support are coupled together so as to define a space between the stiffener and the wall of the support so that the support retains a freedom of movement with respect to bending.

10. The structural element according to claim 9, wherein the hole has a second end which is closed.

11. The structural element according to claim 9, wherein the hole is at least approximately coaxial with an axis of symmetry of the element.

12. The structural element according to claim 9, wherein the stiffener is at most fixed to the support at one point.

13. The structural element according to claim 9, wherein the filiform strain sensor is an optical fibre Bragg grating.

14. The device according to claim 1, wherein the stiffener is removeably coupled to the support.

15. The structural element according to claim 9, wherein the stiffener is removeably coupled to the support.

16. A strain measurement device, comprising:
   at least one filiform strain sensor;
   a support of longilinear shape on which the filiform strain sensor is positioned; and
   a stiffener;
   wherein the support is hollow, and has a longitudinal direction and a width, with the support further comprising a wall having a thickness and having an external surface on which the filiform strain sensor is positioned by one or more connecting points, a main strain direction of the filiform strain sensor being arranged parallel to the longitudinal direction of the support, and
   wherein the stiffener and a wall of the support are coupled together so as to define a space between the stiffener and the wall of the support so that the support retains a freedom of movement with respect to bending.

* * * * *